United States Patent
Mansour et al.

(10) Patent No.: US 12,156,193 B2
(45) Date of Patent: Nov. 26, 2024

(54) SYSTEM AND METHOD FOR SPECTRUM MANAGEMENT OF OVERLAPPING BANDWIDTH

(71) Applicant: T-MOBILE INNOVATIONS LLC, Overland Park, KS (US)

(72) Inventors: Nagi A. Mansour, Arlington, VA (US); Akin Ozozlu, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 153 days.

(21) Appl. No.: 17/518,871

(22) Filed: Nov. 4, 2021

(65) Prior Publication Data
US 2023/0135841 A1      May 4, 2023

(51) Int. Cl.
*H04W 72/044*      (2023.01)

(52) U.S. Cl.
CPC ................. *H04W 72/0466* (2013.01)

(58) Field of Classification Search
None
See application file for complete search history.

(56) References Cited

U.S. PATENT DOCUMENTS

| | | | |
|---|---|---|---|
| 10,873,838 B2 | 12/2020 | Hwang et al. | |
| 2020/0280465 A1* | 9/2020 | Kim | H04L 25/0226 |
| 2021/0168801 A1* | 6/2021 | Wang | H04W 72/12 |
| 2021/0195488 A1* | 6/2021 | Zhang | H04W 36/24 |
| 2021/0258898 A1* | 8/2021 | Ma | H04L 5/0048 |
| 2022/0052812 A1* | 2/2022 | Liu | H04L 5/0094 |
| 2022/0132509 A1* | 4/2022 | Huss | H04L 5/001 |

FOREIGN PATENT DOCUMENTS

| | | | |
|---|---|---|---|
| WO | WO2019194213 | * | 4/2019 |
| WO | WO2021193995 | * | 3/2020 |
| WO | 2020/168253 A1 | | 8/2020 |
| WO | WO2022155102 | * | 1/2022 |

* cited by examiner

*Primary Examiner* — Mohammad S Adhami
(74) *Attorney, Agent, or Firm* — Jones Robb, PLLC

(57) ABSTRACT

Systems, methods, and processing nodes for managing spectrum in a telecommunications network perform and/or comprise: determining that a first bandwidth part (BWP) on which a wireless device communicates with an access node at least partially overlaps with a second BWP, wherein the first BWP has a first numerology and the second BWP has a second numerology; and instructing the wireless device and the access node to multiplex a communication signal with an orthogonal code prior to transmitting the communication signal.

20 Claims, 5 Drawing Sheets

Determine that First BWP and Second BWP Overlap — 610

Instruct Wireless Device and Access Node to Multiplex Signal with Orthogonal Code — 620

SYSTEM AND METHOD FOR SPECTRUM MANAGEMENT OF OVERLAPPING BANDWIDTH

TECHNICAL BACKGROUND

Wireless telecommunications are generally provided via a plurality of geographically overlapping networks. From an infrastructure standpoint, a wireless device ("user equipment" or UE) may receive telecommunications services via an access node. For cellular telephone and data services, the individual networks may implement a plurality of radio access technologies (RATs) simultaneously using one or a plurality of access nodes. RATs can include, for example, 3G RATs such as Global System for Mobile Communications (GSM), Universal Mobile Telecommunications System (UMTS), Code-Division Multiple Access (CDMA), etc.; 4G RATs such as Worldwide Interoperability for Microwave Access (WiMAX), Long Term Evolution (LTE), etc.; and 5G RATs such as new radio (NR).

Various portions of the electromagnetic spectrum have been allocated to wireless telecommunications. For example, 4G LTE communication utilizes frequencies below 6 gigahertz (GHz), and 5G NR communication utilizes frequencies below 6 GHz (Frequency Range 1) and above 24 GHz (Frequency Range 2). These frequencies are further divided into a plurality of bands, some of which may overlap, depending on the RAT. For example, LTE spectrum includes Band 2, corresponding to uplink frequencies between 1920 megahertz (MHz) and 1980 MHz and downlink frequencies between 2110 MHz and 2170 MHz; Band 5, corresponding to uplink frequencies between 824 MHz and 849 MHz and downlink frequencies between 869 MHz and 894 MHz; Band 4, corresponding to uplink frequencies between 1710 MHz and 1755 MHz and downlink frequencies between 2110 MHz and 2155 MHz; and so on.

In LTE communication, the bands are further divided into component carriers (CCs), which correspond to bandwidths of up to 20 MHz. These may be aggregated together in certain types of LTE communication to provide increased bandwidth (e.g., up to 100 MHz in LTE-Advance). In NR communication, CCs may correspond to bandwidths of up to 100 MHz in Frequency Range 1 and up to 400 MHz in Frequency Range 2. NR CCs may also be aggregated together to provide increased bandwidth. Due to this wide bandwidth, NR introduces the concept of a bandwidth part (BWP), which is a group of contiguous of resource blocks (RBs). Different BWPs may be configured with different parameters and/or signal characteristics, thereby providing increased flexibility in how the overall carrier is used. The different parameters and/or signal characteristics may be implemented using the concept of "numerologies," which correspond to sets of parameters such as subcarrier spacing and symbol duration. In instances where different BWPs overlap, they may be implemented with different numerologies.

In Frequency Range 1, there may exist overlap in frequencies between LTE and NR. For example, LTE Band 71 and NR Band n71 both correspond to uplink frequencies between 663 MHz and 698 MHz and downlink frequencies between 617 MHz and 652 MHz. Because bands are not operator-specific (i.e., multiple different network operators may provide service on the same band), frequency overlap may occur between carriers or BWPs operated by one network operator and carriers or BWPs operated by another network operator.

Overview

Various aspects of the present disclosure relate to systems and methods of managing spectrum in a network, such as a telecommunications network including overlapping frequencies utilized by one or multiple network operators.

In one exemplary aspect of the present disclosure, a method of spectrum management in a network comprises: determining that a first bandwidth part (BWP) on which a wireless device communicates with an access node at least partially overlaps with a second BWP, wherein the first BWP has a first numerology and the second BWP has a second numerology; and instructing the wireless device and the access node to multiplex a communication signal with an orthogonal code prior to transmitting the communication signal.

In another exemplary aspect of the present disclosure, a system for spectrum management in a first network comprises: a processing node; and a processor coupled to the processing node, the processor being configured to perform operations comprising: determining that a wireless device is connected to an access node in a first bandwidth part (BWP) of a band of the first network, the first network having a first numerology, determining that the first BWP at least partially overlaps with a second BWP of a band of a second network, the second network having a second numerology, and instructing the wireless device and the access node to multiplex a communication signal with an orthogonal code prior to transmitting the communication signal from one of the wireless device and the access node to the other of the wireless device and the access node.

In another exemplary aspect of the present disclosure, a processing node for spectrum management in a network including a wireless device and an access node is configured to perform operations comprising: determining that the wireless device and the access node are configured to communicate on a first bandwidth part (BWP) that at least partially overlaps with a second BWP, wherein the first BWP has a first numerology and the second BWP has a second numerology; and instructing the wireless device and the access node to communicate by multiplexing a communication signal with an orthogonal code prior to transmission.

In this manner, these and other aspects of the present disclosure provide for improvements in at least the technical field of telecommunications, as well as the related technical fields of network management, device management, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
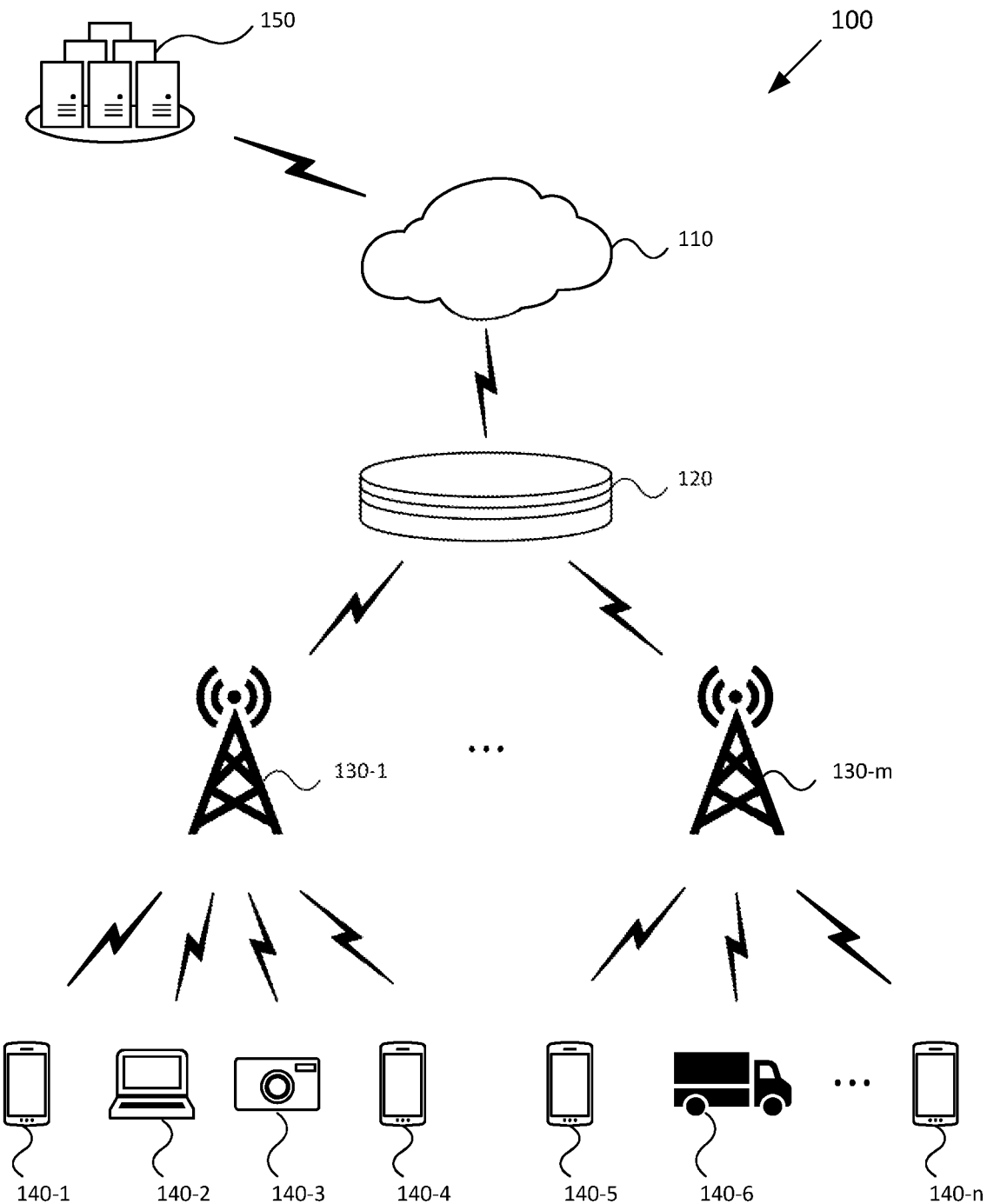
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processing node or nodes on the network for executing the instructions or methods. The processing node or nodes may include a processor included in the access node and/or a processor included in any controller node in the wireless network that is coupled to the access node.

As noted above, there may exist overlap in certain bands of spectrum between frequencies allocated to different BWPs. Even if the BWPs have different numerologies and/or correspond to different RATs, this overlap may result in interference. If one of the interfering BWPs belongs to a different, and perhaps competing, network operator, it may be difficult or otherwise undesirable to reconfigure the spectrum to avoid the overlap. Therefore, there exists a need for a solution which reduces or removes interference between BWPs or carriers with different numerologies while permitting them to coexist on the same portion of spectrum.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as a smartphone, a tablet, a laptop computer, and so on.

Data to and from wireless devices may be transmitted using a series of data frames, each of which has a duration of 10 milliseconds (ms). A frame constitutes ten subframes, each having a duration of 1 ms. In NR communication, each subframe is further divided into one or more slots, wherein the number of slots depends on the numerology of the corresponding BWP for the communication, and each slot is further divided into fourteen (or in some cases twelve) data symbols. The term "numerology" refers to a set of carrier waveform parameters, including subcarrier spacing ($\Delta f$), cyclic prefix (CP) duration, and slot duration/number. Numerology may be identified by the numerology index μ. The subcarrier spacing in kilohertz (kHz) is related to the numerology index by the relation $\Delta f = 2^\mu \cdot 15$, and the slot duration in microseconds (μs) is related to the numerology index by the relation $T_{slot} = 2^\mu$. All numerologies correspond to fourteen symbols per subframe with the exception of μ=2, which includes a twelve-symbol extended CP option in addition to the 14-symbol option. These parameters are standardized, and are set forth in the following Table 1:

TABLE 1

| Index μ | Δf (kHz) | $T_{CP}$ (μs) | $T_{slot}$ (μs) | $N_{slot}$ |
|---|---|---|---|---|
| 0 | 15 | 4.7 | 1 | 1 |
| 1 | 30 | 2.3 | 0.5 | 2 |
| 2 | 60 | 1.2/4.2 | 0.25 | 4 |
| 3 | 120 | 0.6 | 0.125 | 8 |
| 4 | 240 | 0.3 | 0.0625 | 16 |

LTE communication utilizes a subcarrier spacing of 15 kHz and two 0.5-ms slots per subframe. LTE includes an extended CP option with six symbols per slot ($T_{CP}$=16.7 μs) and a normal CP option with seven symbols per slot ($T_{CP}$=5.2 μs). For purposes of this disclosure and ease of explanation, LTE communication is interpreted as having a numerology index μ=0.

For purposes of illustration and explanation, various portions of this detailed description refer to implementations in a network including 4G and/or 5G RATs; however, the present disclosure is not so limited. The systems and methods described herein may be implemented in any RAT or combinations of RATs, including but not limited to 3G RATs such as GSM, UMTS, CDMA, etc.; 4G RATs such as WiMAX, LTE, etc.; 5G RATs such as NR; and further extensions or updated implementations of the same.

Examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with an NR gNodeB.

FIG. 1 illustrates an exemplary system 100 for use with various aspects of the present disclosure. As illustrated, the system 100 includes a cloud platform 110, a core network 120, and a plurality of access nodes 130-1 to 130-m (collectively referred to as access nodes 130), and a plurality of wireless devices 140-1 to 140-n (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network 120 via a wired connection.

The cloud platform 110, which may be an LTE cloud platform and/or an NR cloud platform, may perform processing and forward results to the computing systems and devices 150 and/or the wireless devices 140. The core network 120, which may be an LTE core network and/or an NR core network, connects with the cloud platform 110 and the access nodes 130. For LTE communication, the core network 120 may be implemented on a fixed-function, hard-wired architecture. Examples of the core network and/or the access nodes 130 will be described in more detail below with respect to FIGS. 2 and 3. Subsets of the access nodes 130 may be respectively configured to provide service in different areas, on different bands, for different RATs, and so on. FIG. 1 illustrates a situation in which the system 100 is operated by a single network operator. In many geographical areas, multiple network operators provide coverage that may overlap, as will be described in more detail below with regard to FIG. 2.

The wireless devices 140 are devices configured with appropriate technologies for connecting to the cloud platform 110. The wireless devices 140 may be or include mobile communication devices such as smartphones, laptop computers, tablet computers, and the like; vehicles such as cars, trucks, and the like; and/or Internet-of-Things (IoT) devices such as smart-home sensors, and the like. Examples of the wireless devices 140 will be described in more detail below with respect to FIGS. 2 and 4.

Figure 2:
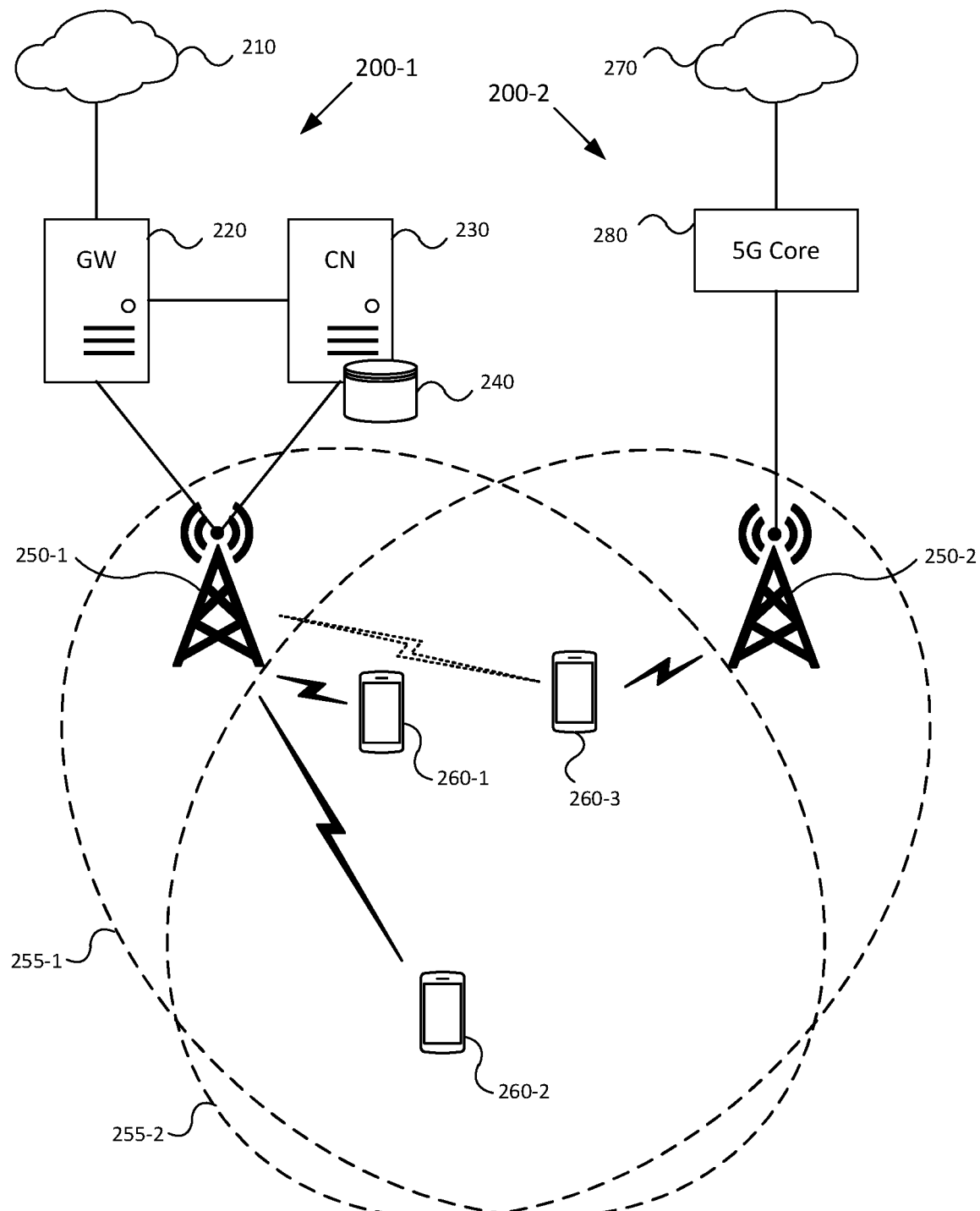
FIG. 2 illustrates an exemplary configuration of a system for wireless communication in accordance with various aspects of the present disclosure.

FIG. 2 illustrates a configuration in which a first exemplary system 200-1 (e.g., a network provided by a first network operator) and a second exemplary system 200-2 (e.g., a network provided by a second network operator) provide overlapping coverage within a particular area. For purposes of illustration and explanation, the first system 200-1 is illustrated as an LTE network and the second system 200-2 is illustrated as an NR network; however, in practical implementations the first system 200-1 and/or the second system 200-2 may individually correspond to any RAT or combinations of RATs, including but not limited to 3G RATs such as GSM, UMTS, CDMA, etc.; 4G RATs such as WiMAX, LTE, etc.; 5G RATs such as NR; and further extensions or updated implementations of the same. An individual system may include multiple RATs concurrently. Moreover, the first system 200-1 may correspond to the same RAT as the second system 200-2 or to a different RAT. While the following description refers to methods, systems, and processing nodes which may be implemented in the first system 200-1, the methods, systems, and processing nodes may additionally or alternatively be implemented in the second system 200-2.

As illustrated, the first system 200-1 comprises a first communication network 210, a gateway node 220, a controller node 230 which includes a database 240, a first access node 250-1, a first wireless devices 260-1, and a second wireless device 260-2. For purposes of illustration and ease of explanation, only one access node and two wireless devices are shown corresponding to the first system 200-1; however, as noted above with regard to FIG. 1, additional access nodes and/or additional or fewer wireless devices may be present in the first system 200-1. In the illustration of FIG. 2, the first access node 250-1 communicates with the gateway node 220 and the controller node 230 via communication links 253 and 254, respectively, which may be a direct link (e.g., an X2 link or the like). The first access node 250-1 provides service in a first coverage area 255-1.

The second system 200-2 comprises a second communication network 270, a 5G core 280, a second access node 250-2, and a third wireless device 260-3. For purposes of illustration and ease of explanation, only one access node and one wireless device are shown corresponding to the second system 200-2; however, as noted above with regard to FIG. 1, additional access nodes and/or additional or fewer wireless devices may be present in the second system 200-2. The second access node 250-2 provides service in a second coverage area 255-2. While the third wireless device 260-3 is configured for communication with the second access node 250-2 and not for communication with the first access node 250-1 (e.g., the owner of the third wireless device 260-3 may be a subscriber with an operator of the second system 200-2 but not with an operator of the first system 200-1), the third wireless device 260-3 may be located in the first coverage area 255-1. Therefore, transmissions originating from the third wireless device 260-3 may cause interference at the first access node 250-1, as shown by the dotted-line connection. While the first coverage area 255-1 and the second coverage area 255-2 are illustrated as having separate coverage areas and a common (overlapping) coverage area, in some implementations one of the first coverage area 255-1 and the second coverage area 255-2 may be subsumed within the other or the first coverage area 255-1 and the second coverage area 255-2 may be largely congruent.

A scheduling entity may be located within the first access node 250-1, the second access node 250-2, the controller node 230, and/or the 5G core 280, and may be configured to accept and deny connection requests, as will be described in more detail below. The first access node 250-1 and/or the second access node 250-2 may be any network node configured to provide communications between the connected wireless devices and the communication networks 210 or 270, including standard access nodes and/or short range, lower power, small access nodes. As examples of a standard access node, the first access node 250-1 and/or the second access node 250-2 may be a macrocell access node, a base transceiver station, a radio base station, a gNodeB in 5G networks, an eNodeB in 4G/LTE networks, or the like, including combinations thereof. In one particular example, the first access node 250-1 and/or the second access node 250-2 may be a macrocell access node in which a respective range of the first coverage area 255-1 and/or the second coverage area 255-2 is from approximately five to thirty-five kilometers (km) and in which the output power is in the tens of watts (W). As examples of a small access node, the first access node 250-1 and/or the second access node 250-2 may be a microcell access node, a picocell access node, a femtocell access node, or the like, including a home gNodeB or a home eNodeB.

The first access node 250-1 and/or the second access node 250-2 can comprise one or more processors and associated circuitry to execute or direct the execution of computer-readable instructions such as those described herein. In so doing, the first access node 250-1 and/or the second access node 250-2 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the first access node 250-1 and/or the second access node 250-2 can receive instructions and other input at a user interface.

Figure 3:
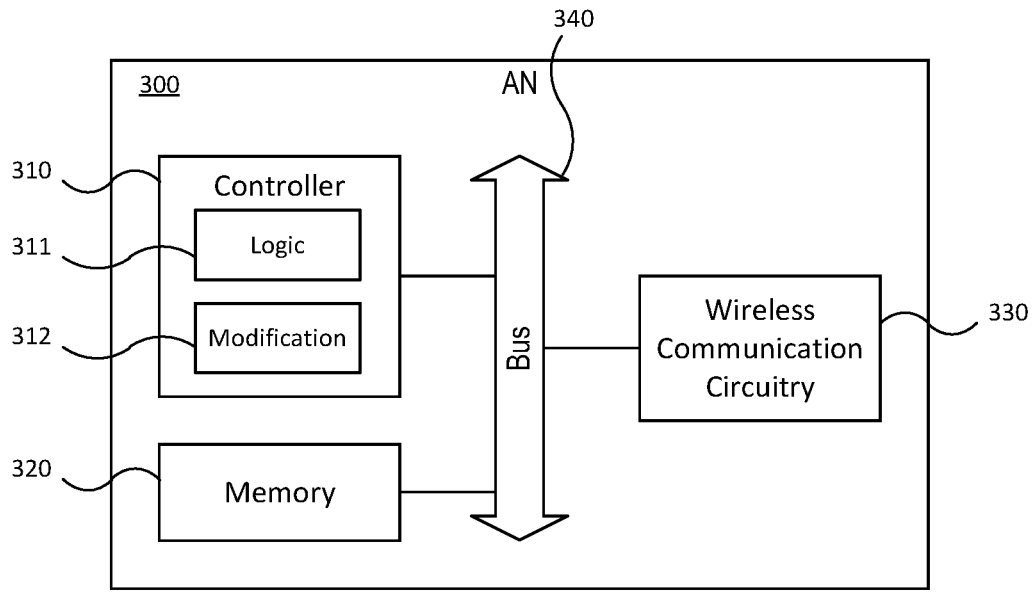
FIG. 3 illustrates an exemplary access node in accordance with various aspects of the present disclosure.

FIG. 3 illustrates one example of an access node 300, which may correspond to one or more of the access nodes 130 shown in FIG. 1 and/or the first and/or second access node 250-1/250-2 shown in FIG. 2. As illustrated the access node 300 includes a controller 310, a memory 320, wireless communication circuitry 330, and a bus 340 through which the various elements of the access node 300 communicate with one another. As illustrated, the controller 310 includes sub-modules or units, each of which may be implemented via dedicated hardware (e.g., circuitry), software modules which are loaded from the memory 320 and processed by the controller 310, firmware, and the like, or combinations thereof. These sub-modules or units include a logic unit 311 (e.g., logic circuitry or a logic program) configured to perform various determinations and a modification unit 312 (e.g., modification circuitry or a modification program) configured to perform various signal modifications.

The logic unit 311 may be configured to determine that a first BWP on which a wireless device communicates with the access node 300 at least partially overlaps with a second BWP. The first BWP and the second BWP may have respective numerologies, and in some implementations the logic unit 311 may further be configured to determine these numerologies. The first BWP and the second BWP may belong to different networks; for example, the first BWP may be provided by the access node 300 which belongs to a first network provider (e.g., the first access node 250-1 of FIG. 2) and the second BWP may be provided by another access node belonging to a second network provider (e.g., the second access node 250-2 of FIG. 2). In some implementations, the logic unit 311 may first be configured to determine that a wireless device is in fact connected to the access node 300 in the first BWP.

The modification unit 312 may be configured to modify a communication signal for transmission. For example, the modification unit 312 may instruct the access node 300 to multiplex a communication signal with an orthogonal code prior to transmitting the communication signal (e.g., to the connected wireless device), and/or may instruct the connected wireless device to multiplex a communication signal with an orthogonal code prior to transmitting the communication signal (e.g., to the access node 300). The modification unit 312 may also instruct the recipient device (either the connected wireless device or the access node 300) to separate the communication signal that has been multiplexed with the orthogonal code from signals that have not been multiplexed with the orthogonal code. In this manner, the wireless device and/or access node may be capable of distinguishing in-network communications (e.g., communications between the first access node 250-1 and the first communication device 260-2 of FIG. 2) from out-of-network communications (e.g., communications between the second access node 150-2 and the third communication device 260-3 of FIG. 2) even if those communications occupy the same or similar frequencies. The modification unit 312 may also instruct the recipient device to separate the orthogonal code from the received communication signal.

The logic unit 311 and/or the modification unit 312 may physically reside within the controller 310, or may be virtual structures operable to control other components of the access node 300 to implement the above operations. For example, the modification unit 312 may be configured to itself multiplex the communication signal with the orthogonal code, or may be configured to provide a control signal to the wireless communication circuitry 330 thereby to cause the wireless communication circuitry 330 to multiplex the communication signal with the orthogonal code. Moreover, one or more of the units may instead reside within the memory 320 and/or may be provided as separate units within the access node 300. Moreover, while the logic unit 311 and the modification unit 312 are illustrated as separate units, in practical implementations some or all of the units may be combined and/or share components.

The wireless communication circuitry 330 may include circuit elements configured for inbound communication to receive wireless signals (e.g. one or more antennas) as well as interface elements configured, for example, to translate data signals from wireless input into control or other signals for the controller 310. Moreover, the wireless communication circuitry 330 may include circuit elements configured for outbound communication to generate wireless signals (e.g., one or more antennas) as well as interface elements configured, for example, to translate control signals from the controller 310 into data signals for wireless output. For example, the access node 300 may be configured to receive connection requests via the wireless communication circuitry 330 and output connection determinations via the wireless communication circuitry 330, thereby allowing or denying the connection requests. The access node 300 may include additional wireless communication circuitry elements, for example to communicate using additional frequencies and/or to provide connectivity for different RATs. The access node 300 may further include additional wired communication circuitry elements.

Figure 4:
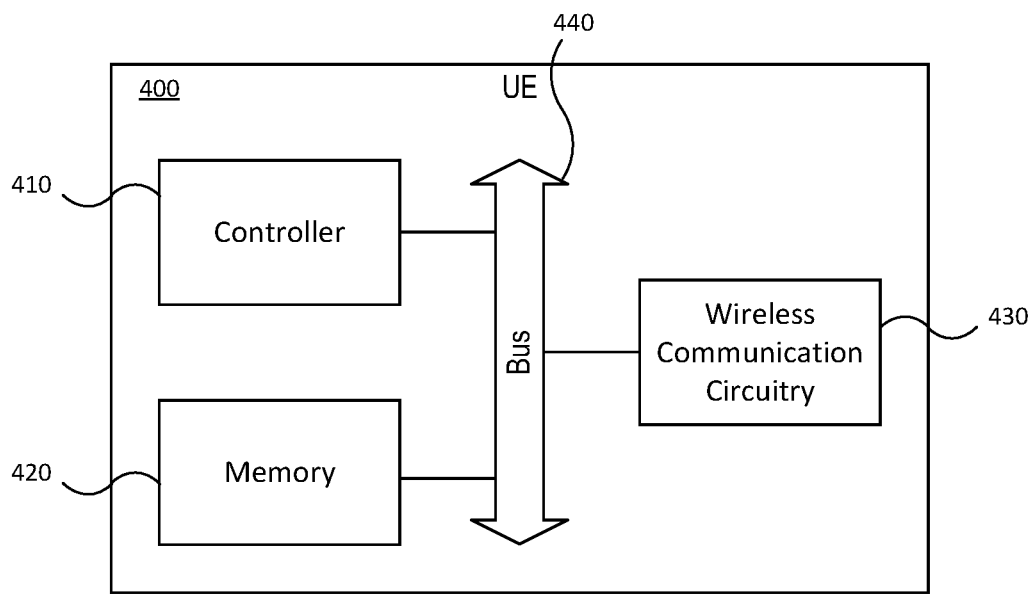
FIG. 4 illustrates an exemplary wireless device in accordance with various aspects of the present disclosure.

FIG. 4 illustrates one example of a wireless device 400 (i.e., a UE), which may correspond to one or more of the wireless devices 140 shown in FIG. 1 and/or the first, second, and/or third wireless devices 260-1 to 260-3 shown in FIG. 2. As illustrated the wireless device 400 includes a controller 410, a memory 420, a wireless communication circuitry 430, and a bus 440 through which the various elements of the wireless device 400 communicate with one another.

The wireless communication circuitry 430 may include circuit elements configured for inbound communication to receive wireless signals (e.g. one or more antennas) as well as interface elements configured, for example, to translate data signals from wireless input into control or other signals for the controller 410. Moreover, the wireless communication circuitry 430 may include circuit elements configured for outbound communication to generate wireless signals (e.g., one or more antennas) as well as interface elements configured, for example, to translate control signals from the controller 410 into data signals for wireless output. For example, the wireless device 400 may be configured to transmit connection requests via the wireless communication circuitry 430 and receive responses via the wireless communication circuitry 430, the responses indicating whether the connection requests have been accepted or denied. The wireless device 400 may include additional wireless communication circuitry elements, for example to communicate using different RATs. The controller 410, the memory 420, and/or the wireless communication circuitry 430 may include circuit elements (e.g., a multiplexer and/or demultiplexer) or logical structures to multiplex orthogonal codes with transmitted communication signals and/or to separate the orthogonal codes from received communication signals.

Returning to FIG. 2, the communication networks 210 and/or 270 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The communication networks 210 and/or 270 can be capable of carrying data, for example to support voice, push-to-talk (PTT), broadcast video, and/or data communications by the wireless devices 260. Wireless network protocols can comprise Multimedia Broadcast Multicast Services (MBMS), CDMA, 1×RTT, GSM, UMTS, High Speed Packet Access (HSPA), Evolution-Data Optimised (EV-DO), EV-DO rev. A, 3GPP LTE, WiMAX, 4G including LTE Advanced and the like, and 5G including 5G NR or 5G LTE, or combinations thereof. Wired network protocols that may be utilized by the communication networks 210 and/or 270 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The communication networks 210 and/or 270 may also comprise additional base stations, controller nodes, telephony switches, internet routers, network gateways, computer systems, communication links, other types of communication equipment, and combinations thereof.

The communication links 253 and 254 may respectively use various communication media, such as air, space, metal, optical fiber, other signal propagation paths, and combinations thereof. The communication links 253 and 254 may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1×RTT, GSM, UMTS, HSPA, EV-DO, EV-DO rev. A, 3GPP LTE, WiMAX, 4G including LTE Advanced and the like, and 5G including 5G NR or 5G LTE, or combinations thereof. The communication links 253 and 254 may respectively be a direct link or might include various equipment, intermediate components, systems, and networks. The communication links 253 and 254 may comprise many different signals sharing the same link.

The gateway node 220 may be any network node configured to interface with other network nodes using various protocols. The gateway node 220 can communicate user data over the first system 200-1. The gateway node 220 may be a standalone computing device, computing system, or network component, and can be accessible by, for example, a wired or wireless connection, or through an indirect connection such as via a computer network or communication network. The gateway node 220 may include but is not limited to a serving gateway (SGW) and/or a public data network gateway (PGW). Additionally or alternatively, the gateway node 220 may include user plane network functions (NFs), such as a User Plane Function (UPF). The gateway node 220 is not limited to any specific technology architecture, such as LTE or 5G NR, but may be used with any network architecture and/or protocol.

The gateway node 220 can comprise a processor and associated circuitry to execute or direct the execution of computer-readable instructions to obtain information. In so doing, the gateway node 220 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the gateway node 220 can receive instructions and other input at a user interface.

The controller node 230 may be any network node configured to communicate and/or control information over the first system 200-1. The controller node 230 may be configured to transmit control information associated with resource usage thresholds and/or usage parameters. The controller node 230 may be a standalone computing device, computing system, or network component, and can be accessible by, for example, a wired or wireless connection, or through an indirect connection such as via a computer network or communication network. The controller node 230 may include but is not limited to an MME, a HSS, a Policy Control and Charging Rules Function (PCRF), an authentication, authorization, and accounting (AAA) node, a rights management server (RMS), a subscriber provisioning server (SPS), a policy server, and the like. Additionally or alternatively, the controller node 230 may comprise user plane NFs and/or control plane NFs, including but not limited to a Core Access and Mobility management Function (AMF), an Authentication Server Function (AUSF), a Unified Data Management (UDM), a Session Management Function (SMF), a Policy Control Function (PCF), an Application Function (AF), a Network Exposure Function (NEF), a NF Repository Function (NRF), a Network Slice Selection Function (NSSF), a Short Message Service Function (SMSF), and the like. The controller node 230 is not limited to any specific technology architecture, such as LTE or 5G NR, but may be used with any network architecture and/or protocol.

The controller node 230 can comprise a processor and associated circuitry to execute or direct the execution of computer-readable instructions to obtain information. In so doing, the controller node 230 can retrieve and execute software from storage, which can include a disk drive, a flash drive, memory circuitry, or some other memory device, and which may be local or remotely accessible. As illustrated in FIG. 2, the controller node 230 includes the database 240 for storing information, such as predetermined resource usage thresholds utilized for dynamically managing RATs of the first and second wireless devices 260-1/260-2, as well as positions and/or characteristics of the wireless devices 260. The database 240 may further store handover thresholds, scheduling schemes, and resource allocations for the first access node 250-1, the first and/or second wireless devices 260-1/260-2, and so on. This information may be requested or shared with the first second access node 250-1 via the communication link 254, X2 connections, and the like. The software may comprise computer programs, firmware, or some other form of machine-readable instructions, and may include an operating system, utilities, drivers, network interfaces, applications, or some other type of software, including combinations thereof. Moreover, the controller node 230 can receive instructions and other input at a user interface.

Other network elements may be present in first system 200-1 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the first access node 250-1 and communication network 210.

In the second system 200-2 as illustrated, the second access node 250-2, the second communication network 270, and/or the 5G core 280 may collectively implement several control plane NFs and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane NFs include but are not limited to a Unified Data Repository (UDR) and a UPF. Control plane NFs can provide one or more NFs based on a request-response or subscribe-notify model. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 280. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the 5G core 280, thereby terminating RAN control plane and UE traffic originating on either the N1 or N2 reference interface. In the 5G core 280, the functionality of the 4G Mobility Management Entity (MME) is decomposed into the AMF and the SMF. The AMF receives all connection and session related information from the UE using N1 and N2 interfaces, and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QOS) handling, etc. When compared with 4G EPC, the functions of the UPF may resemble those of the SGW-U (Serving Gateway User Plane function) and PGW-U (PDN Gateway User Plane function).

Thus, in a networking layout as illustrated in FIG. 2, multiple networks, including networks from different operators, may concurrently exist in the same geographical area.

In certain situations, networks from different operators in the same geographical area may operate in BWPs covering the same portion of spectrum (e.g., between LTE networks of one operator and NR Frequency Range 1 networks of another operator). An example of such a situation is illustrated in FIG. 5.

Figure 5:
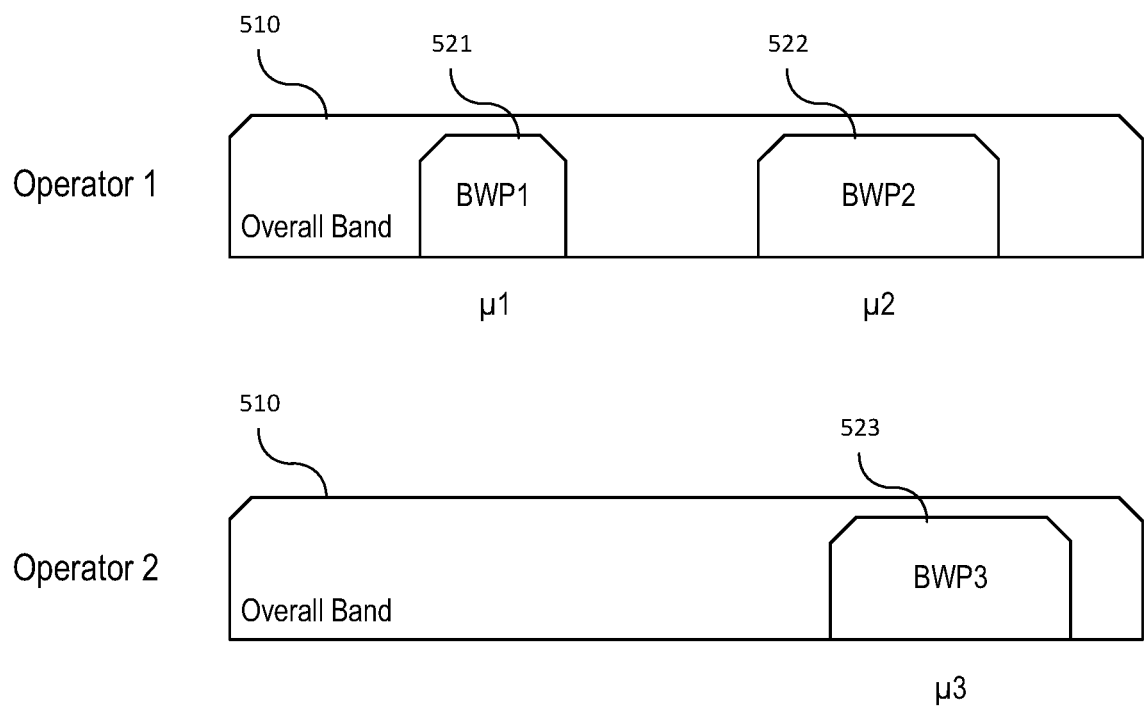
FIG. 5 illustrates an exemplary bandwidth configuration in accordance with various aspects of the present disclosure.

In FIG. 5, two network operators provide service on the same overall band 510. The first operator (labeled "Operator 1") may be the provider of a network such as the second exemplary system 200-2 illustrated in FIG. 2 and the second operator (labeled "Operator 2") may be the provider of a network such as the first exemplary system 200-1 illustrated in FIG. 2, or vice versa. As noted above, either or both network may correspond to LTE, NR, or another RAT, and both networks may correspond to the same or different RATs. In instances where both networks are LTE networks, the overall band 510 may correspond to any designated band in the LTE spectrum. In instances where one network is an LTE network and the other network is an NR network, the overall band 510 may correspond to any designated band in the LTE spectrum and its corresponding designated band in Frequency Range 1 of the NR spectrum. In instances where both networks are NR networks, the overall band 510 may correspond to any designated band in either Frequency Range 1 or Frequency Range 2 of the NR spectrum. In some implementations, one or both Operators may provide multiple networks within the overall band 510, such as LTE service on certain bandwidths and NR service on other bandwidths.

In the illustrated example, Operator 1 is the provider of a hybrid network which includes NR service on a first BWP 521 and LTE service on a second BWP 522 within the overall band 510, and Operator 2 is the provider of an NR network which includes service on a third BWP 523. The first BWP 521 corresponds to a first numerology $\mu_1$, the second BWP 522 corresponds to a second numerology $\mu_2$, and the third BWP 523 corresponds to a third numerology $\mu_3$. The second numerology $\mu_2$ and the third numerology $\mu_3$ may be different from one another. As noted above, because the terms "BWP" and "numerology" are described with regard to NR and not LTE, the term "second BWP 522" and "second numerology $\mu_2$" are merely used for convenience. In other words, the second BWP 522 may correspond to the portion of the overall band 510 on which Operator 1 provides LTE service, and the second numerology $\mu_2$ may be considered as 0. While FIG. 5 shows only a certain number of BWPs for each operator, in practice either or both operator may provide service using more or fewer BWPs within the overall band 510.

Figure 6:
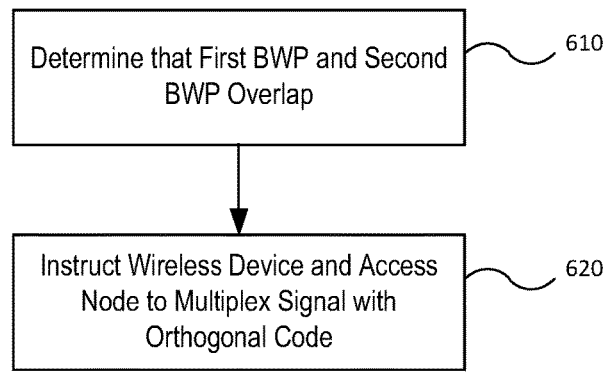
FIG. 6 illustrates an exemplary general process flow for managing spectrum in accordance with various aspects of the present disclosure.
Figures 7, 8:
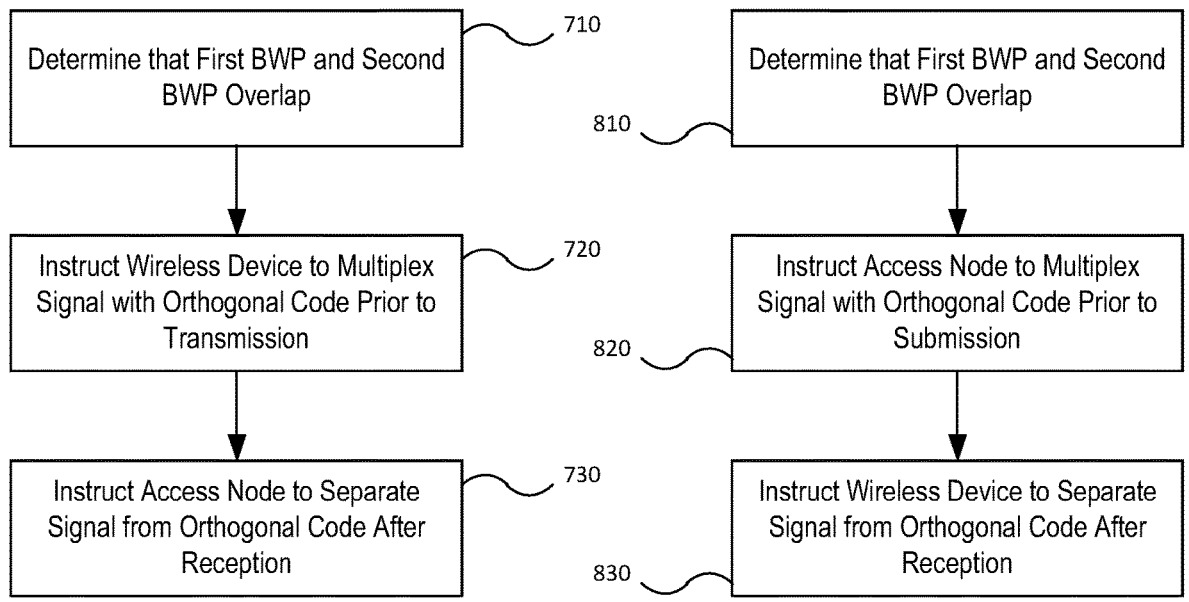
FIGS. 7 and 8 respectively illustrate exemplary process flows for managing spectrum in accordance with various aspects of the present disclosure.

As shown in FIG. 5, the second BWP 522 and the third BWP 523 partially overlap with one another. To avoid this overlap or any interference that may be caused thereby, systems and methods in accordance with the present disclosure may implement operations as shown in any one or more of FIGS. 6-8. The operations of FIGS. 6-8 are presented with regard to communications between an access node (such as any one or more of the access nodes 130, 250-1, 250-2, and/or 300 described above with regard to FIGS. 1-3) and a wireless device (such as any one or more of the wireless devices 140, 260-1, 260-2, 260-3, and/or 400 described above with regard to FIGS. 1-2 and 4). The operations of FIGS. 6-8 will be described as being performed by the access node, but may in practical implementations be performed by any other network component.

FIG. 6 illustrates a general procedure, and FIGS. 7-8 illustrate specific procedures that may be performed for communications by the wireless device and by the access node, respectively. The operations of FIG. 6 include a determination operation 610, in which the access node determines that a first BWP (e.g., the second BWP 522) on which a wireless device communicates with the access node at least partially overlaps with a second BWP (e.g., the third BWP 523); and a instruction operation 620, in which the access node instructs the wireless device and the access node (that is, itself) to multiplex a communication signal with an orthogonal code prior to transmitting the communication signal. In some implementations, the determination operation 610 may first include determining that the wireless device is connected in the first BWP.

The operations of FIG. 7 include a determination operation 710, in which the access node determines that a first BWP (e.g., the second BWP 522) on which a wireless device communicates with the access node at least partially overlaps with a second BWP (e.g., the third BWP 523); a first instruction operation 720, in which the access node instructs the wireless device to multiplex a communication signal (e.g., all future communication signals) with an orthogonal code prior to transmission; and a second instruction operation 730, in which the access node instructs the access node (that is, itself) to separate the communication signal (e.g., all future communication signals received from the wireless device) from the orthogonal code after reception.

The operations of FIG. 8 include a determination operation 810, in which the access node determines that a first BWP (e.g., the second BWP 522) on which a wireless device communicates with the access node at least partially overlaps with a second BWP (e.g., the third BWP 523); a first instruction operation 820, in which the access node instructs the access node (that is, itself) to multiplex a communication signal (e.g., all future communication signals) with an orthogonal code prior to transmission; and a second instruction operation 830, in which the access node instructs the wireless device to separate the communication signal (e.g., all future communication signals received from the access node) from the orthogonal code after reception. In all of FIGS. 6-8, the orthogonal code may be a code division multiplexing (CDM) code.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of spectrum management in a network, comprising:
    determining, at an access node, that a first bandwidth part (BWP) on which a wireless device communicates with the access node at least partially overlaps with a second BWP on which a second wireless device communicates with a second access node, wherein the first BWP has a first numerology and the second BWP has a second numerology; and
    responsive to the determining that the first BWP at least partially overlaps with the second BWP, instructing the wireless device and the access node to multiplex a communication signal with an orthogonal code prior to transmitting the communication signal.

2. The method according to claim 1, wherein the first BWP is owned by a first network operator that provides service to the wireless device, and the second BWP is owned by a second network operator that does not provide service to the wireless device.

3. The method according to claim 1, wherein the orthogonal code is a code division multiplexing (CDM) code.

4. The method according to claim 1, wherein at least one of the first BWP and the second BWP corresponds to a 4G radio access technology (RAT).

5. The method according to claim 1, wherein at least one of the first BWP and the second BWP corresponds to a 5G radio access technology (RAT).

6. The method according to claim 1, further comprising:
    instructing the wireless device and the access node to, upon receiving the communication signal that has been multiplexed with the orthogonal code, separate the communication signal from signals that have not been multiplexed with the orthogonal code.

7. The method according to claim 1, wherein the first numerology is different from the second numerology.

8. A system for spectrum management in a first network, comprising:
- a processing node, wherein the processing node is part of an access node; and
- a processor coupled to the processing node, the processor being configured to perform operations comprising:
  - determining that a wireless device is connected to the access node in a first bandwidth part (BWP) of a band of the first network, the first network having a first numerology,
  - determining that the first BWP at least partially overlaps with a second BWP of a band of a second network on which a second wireless device communicates with a second access node, the second network having a second numerology, and
  - responsive to the determining that the first BWP at least partially overlaps with the second BWP, instructing the wireless device and the access node to multiplex a communication signal with an orthogonal code prior to transmitting the communication signal from one of the wireless device and the access node to the other of the wireless device and the access node.

9. The system according to claim 8, wherein the first network and the second network are operated by different network operators.

10. The system according to claim 8, wherein the orthogonal code is a code division multiplexing (CDM) code.

11. The system according to claim 8, wherein one of the first BWP and the second BWP corresponds to a first radio access technology (RAT) and the other of the first BWP and the second BWP corresponds to a second RAT.

12. The system according to claim 8, wherein both of the first BWP and the second BWP correspond to 4G communication.

13. The system according to claim 8, wherein both of the first BWP and the second BWP correspond to 5G communication.

14. The system according to claim 8, wherein the first numerology and the second numerology are different from one another.

15. A processing node for spectrum management in a network including a wireless device and an access node, the processing node being part of the access node or another network node of the network and configured to perform operations comprising:
- determining that the wireless device and the access node are configured to communicate on a first bandwidth part (BWP) that at least partially overlaps with a second BWP on which a second wireless device communicates with a second access node, wherein the first BWP has a first numerology and the second BWP has a second numerology; and
- responsive to determining that the first BWP at least partially overlaps with the second BWP, instructing the wireless device and the access node to communicate by multiplexing a communication signal with an orthogonal code prior to transmission.

16. The processing node according to claim 15, wherein the access node includes the processing node.

17. The processing node according to claim 15, wherein the first BWP is owned by a network operator of the network, and the second BWP is not owned by the network operator of the network.

18. The processing node according to claim 15, further comprising:
- instructing the wireless device and the access node to communicate by separating the communication signal from the orthogonal code after reception.

19. The processing node according to claim 15, wherein respective ones of the first BWP and the second BWP correspond to 4G communication or to 5G communication.

20. The processing node according to claim 15, wherein the first numerology is different from the second numerology.

* * * * *